United States Patent [19]

Yi

[11] 4,357,697
[45] Nov. 2, 1982

[54] DISK COMPLEX FOR REDUCING ELECTROSTATIC FORCES ON A RECORD DISK

[76] Inventor: Soo W. Yi, 97, Changyung-Dong, Dong-Gu, Incheon-Si, Kyunggi-Do, Rep. of Korea

[21] Appl. No.: 136,372

[22] Filed: Apr. 1, 1980

[51] Int. Cl.³ .............................................. G11B 3/58
[52] U.S. Cl. ...................................... 369/72; 369/272
[58] Field of Search .................... 369/72, 73, 74, 272, 369/286, 282, 289, 287, 288, 290, 127, 264; 361/221, 220

[56] References Cited

U.S. PATENT DOCUMENTS 1,881,110  10/1932  Acheson et al. ................ 369/282
2,295,938   9/1942  Dech ............................... 369/290 X
3,676,865  10/1973  Schuller .......................... 369/72 X

FOREIGN PATENT DOCUMENTS 543767  2/1932  Fed. Rep. of Germany ...... 369/282
632486  7/1936  Fed. Rep. of Germany ...... 369/282
438976  3/1912  France ............................... 369/282

*Primary Examiner*—Harry N. Haroian
*Attorney, Agent, or Firm*—McAulay, Fields, Fisher, Goldstein & Nissen

[57] ABSTRACT

A disk complex for reducing the electrostatic forces on a record disk used for storing information, in which two recording surfaces are carried by an intermediate support member, and electrostatic force reducers are coupled with the surfaces and the support member.

10 Claims, 13 Drawing Figures

U.S. Patent  Nov. 2, 1982  Sheet 1 of 2  4,357,697
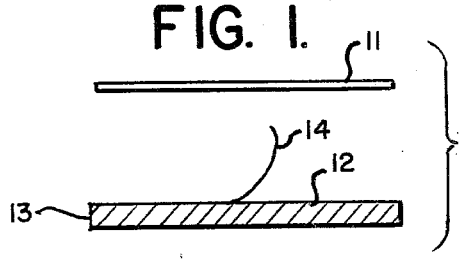
FIG. 1.
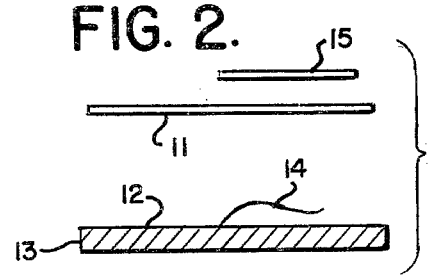
FIG. 2.
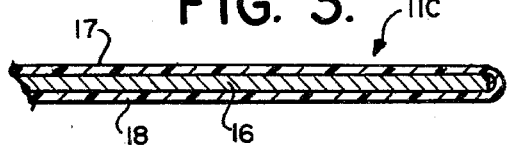
FIG. 3.
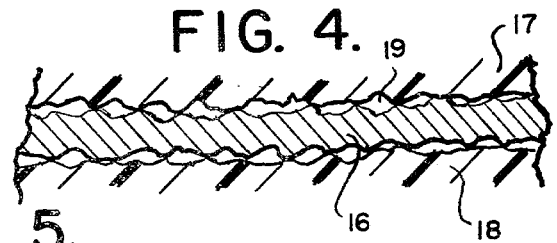
FIG. 4.
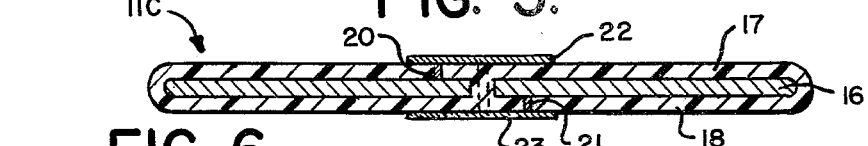
FIG. 5.
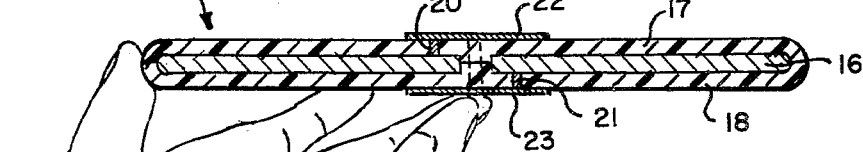
FIG. 6.
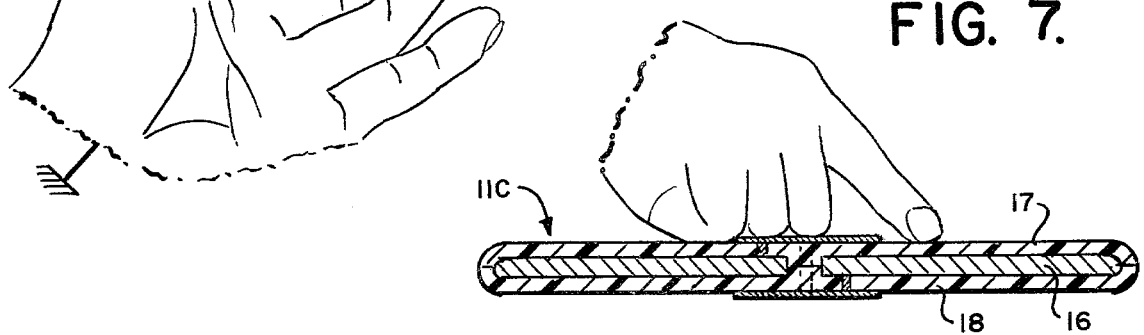
FIG. 7.
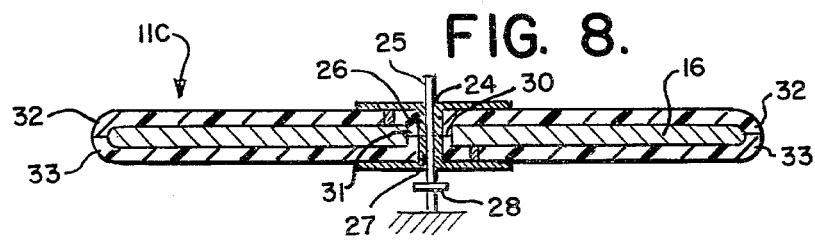
FIG. 8.
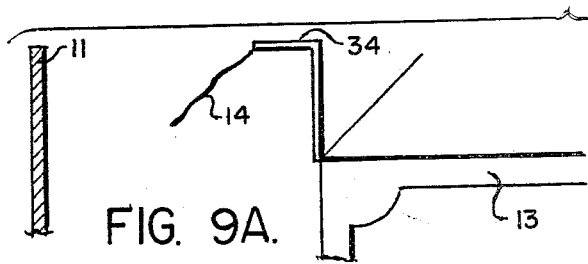
FIG. 9A.
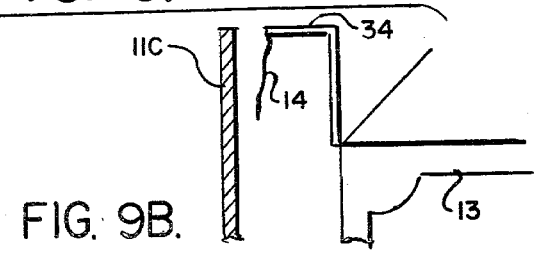
FIG. 9B.
FIG. 9.

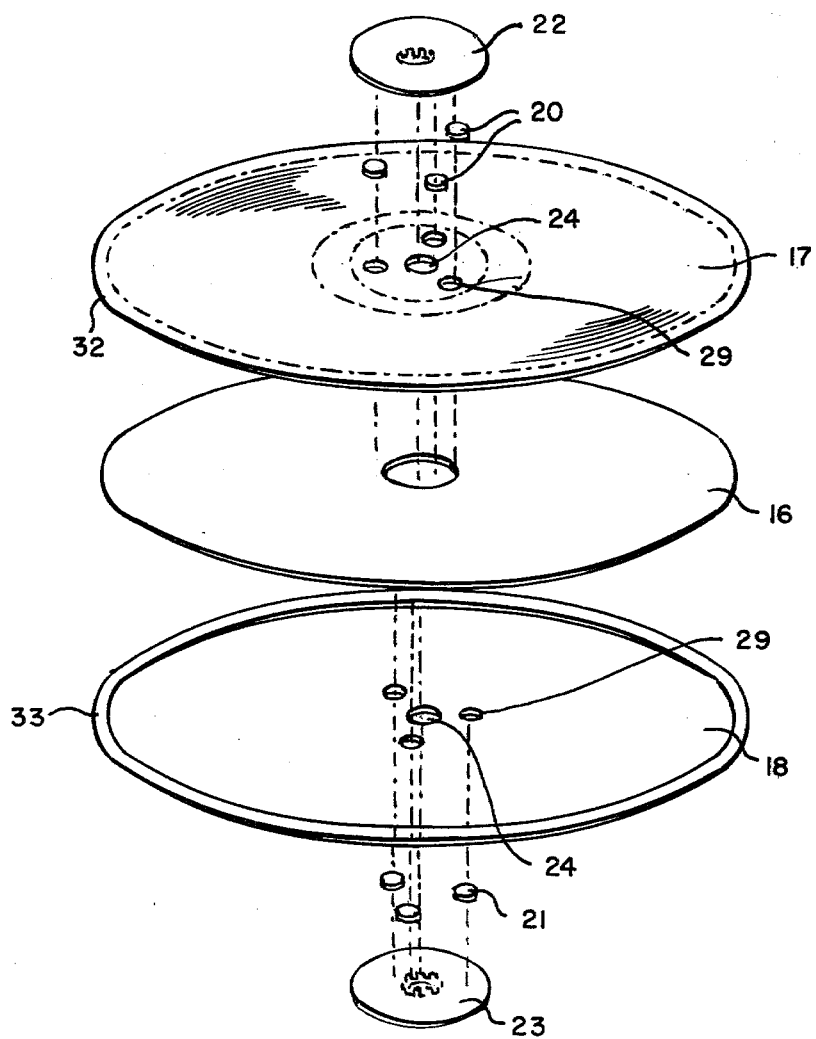
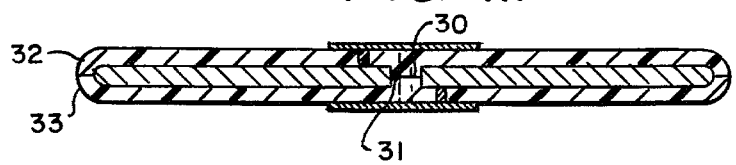
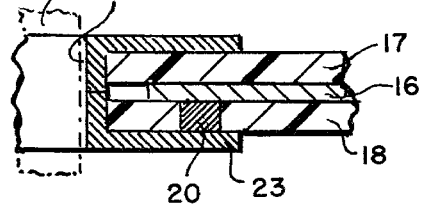

DISK COMPLEX FOR REDUCING ELECTROSTATIC FORCES ON A RECORD DISK

BACKGROUND OF THE INVENTION

This invention is concerned with reducing the problems due to electrostatic forces on a record disk. More particularly, the invention is concerned with a record complex which includes one or more playing surfaces in which the electrostatic forces are reduced.

It is well known that troublesome problems including poor fidelity are due to the electrostatics occuring on a disk recording which is used to convert mechanical signals from or into electrical audio or video signals. These problems due to electrostatics are quite evident in connection with the generally used and conventional vinyl plastic record disks. For example, friction produces the troublesome electrostatics, particularly friction, between the grooves of the record disk and the record needle when signals are reproduced during the playback stage.

The purpose of this invention is to minimize the electrostatic forces which occur on the record disk.

The present invention proposes to overcome the aforesaid difficulties by joining the record disk material with other substances. One of the theoretical principles on which this is based, is firstly the law $C=Q/V$ which governs the relationship between an electric or condenser charge (Q) and voltage (V), and electrostatic capacitance (C), and secondly, on the variation of an electric field surrounding an electrically charged body approached by another substance which has a different surface charge density from that of the charged body. The record disk forms one plate of a condenser, the ground forms the other plate and the air is the dielectric; in this respect, the ground or some other substance which has a different surface charge density from the record disk can form a condenser. The capacitance of the condenser so formed is so little that the charge accumulated on the record disk causes a relatively high voltage and a strong electric field around it. Therefore, the electrostatic force of this electric field has the ability to attract light objects to the record disk. Hence, it can be expected that the electric field around the record disk will be varied, and the strength of the electric field and the voltage will be decreased due to an increased capacitance between the two bodies when another substance with a different surface charge density is brought near to the record disk.

The invention proposes the provision of a disk complex for reducing the electrostatic forces on a record disk used for storage information, which includes a support member, surface or record disk means carried by the support member for the storing of information, and electrostatic force reducing means coupled with the surface means and said support member.

The surface means has a circular configuration and includes a vinyl plastic material suitable for the recording, storing and releasing of audio information contained in electrical signals. The vinyl plastic material is in the form of a disk which substantially conforms to the surface of the support member, and the disk is provided with at least one and preferentially three circumferentially spaced apertures inwardly of the outer periphery thereof extending from a top surface thereof inwardly to the top surface of the support member. The electrostatic force reducing means includes a conductive substance received in each of the spaced apertures for filling thereof to provide for a uniform and continuous outer surface on the outer facing surface of the vinyl plastic material.

The conductive substances are each spaced 60° from each adjacent conductive substance along a circle concentric with the outer perimeter of said sandwich construction and on a side opposite to the side of the two adjacent conductive substances. The electrostatic force reducing means also includes a conductive material on a face of the surface means free of contact with the support member which performs the conventional function of a label, but is also of metallic material to form one plate of a condenser to provide some of the necessary capacitative effect to reduce the electrostatic forces of a conventional record disk which causes problems.

Other purposes and advantages of the invention will become readily apparent to those skilled in the art from the following further detailed explanation of the structure of the disk complex as well as the theory of operation from which such advantages are believed to be derived.

BRIEF DESCRIPTION OF THE DRAWINGS

In order that the invention may be more readily understood and easily carried into effect, the same will now be described with reference to the accompanying drawings, in which:

FIGS. 1 and 2 illustrate the effect of the variation of electrostatic force;

FIG. 3 is a schematic cross-section of a record disk complex with an insert of a substance different from conventional record disk materials for reducing the electrostatic force;

FIG. 4 is an enlarged partial cross-section of the disk complex for which the electrostatic force is reduced and illustrating the junction of two individual record disks and the inserted substance which is of a material different from the disk material;

FIG. 5 is a cross-sectional view of the disk complex with the electrical connections between the inserted different substance and outer record labels which are made of electrically conductive material;

FIGS. 6, 7 and 8 illustrate the different ways in which the inner surface can retain the electrical ground potential.

FIGS. 9A and 9B are schematic views comparing the electrostatic forces on a conventional record disk in FIG. 9A and a record disk complex according to the invention in FIG. 9B;

FIG. 10 is an exploded view of a disk complex according to the invention with reduced electrostatic force;

FIG. 11 is a sectional view of the disk complex of FIG. 10, and

FIG. 12 is an exploded view of a portion of FIG. 11 of the record disk complex in conjunction with the spindle of a record player.

DESCRIPTION OF THE PREFERRED EMBODIMENTS

Referring to the drawings which illustrates the presently preferred mode of carrying out the invention, an exploded view of a record complex 11C in accordance with the invention is shown in FIG. 10, and comprises an intermediate substance or support member 16, a pair of oppositely disposed record disks 17, 18 which are mirror-images of each other, a conventional record disk center hole 24, angularly spaced apertures 29 in disks 17, 18 for receiving conductive substances 20, 21, and metallic labels 22, 23. The record disk complex 11C according to the invention will be further described in connection with the other figures of the drawings.

Some further background explanation with regard to the affect on the record disk of the electrostatic forces will now be explained in more detail in connection with some of the figures of the drawing.

As best seen in FIG. 1, when a record disk 11 which is either rubbed vigorously with a record cleaner or has just been played is brought into parallel relationship to a surface 12 of a table schematically shown at 13 and to which has been fixed some object 14 such as a 7 to 8 cm. long, very thin piece of paper, a cotton thread, animal fur, or hair, object 14 stands on end due to the electrostatic force of the record disk 11. In this condition, if a substance, such as a piece of paper, a metal plate, other piece of cloth or a flat hand as exemplified by reference numeral 15 in FIG. 2 is brought near the upper side or surface 12 of the record disk 11, then the object 14 lies down or moves to the surface 12. This is brought about firstly because of the decrease in electrostatic force due to the variation in the electric field around the record disk 11 and, secondly, because there is now an increase in the capacitance between the record disk 11 and the substance 15. It should also be noted that when substance 15 is removed, then the object 14 again stands on end and resumes the position as shown in FIG. 1. On the basis of this fact, the invention proposes the insertion of a different substance or material 16 into an inner section of the record disk 11.

Reference is made to FIG. 3 which shows a record disk complex 11C formed from a conventional vinyl plastic material, and in which a different substance 16 is placed between two disks or outer vinyl plastic surface members 17 and 18. Substance 16 acts as a support member for disks 17 and 18 which are now made of a thickness less than the thickness of a two-sided conventional record disk.

The effect of the invention can be observed instantly if another substance such as a piece of paper, a piece of cloth, or a metal plate of the same size as a record is sandwiched between two disks and brought close to the object 14 as in FIG. 1. The effect of this structure is invariable whether the substance 16 which is an intermediate is conductive or non-conductive, whether the inner support member or substance 16 is inserted or pressed to the surface of the record disk 11 by heat which is one way to do this in the case of a flat plate.

Reference is now made to FIG. 4 which shows the sandwich construction of FIG. 3 to an enlarged scale and in which a flat plate is used for the substance 16. It will be noted that the junction of the record disk 11 and the flat plate 16 where magnified are not uniformly coextensive or continuous. Each part of the junction or air space as at 19 is not in contact with each other and substance 16 and disk 17, and substance 16 and disk 18 both can be considered to form a condenser having the air in the air space 19 as the dielectric. Therefore, if the space 19 were filled with liquid which has a good permeable or magnetic permeability quality, the capacitance of the entire unit or complex would be increased. Even though this increased capacitance of the complex of substance 16, disks 17, 18 and material filling air space 19 is so minute in comparison with the whole capacitance that it might be neglected, so long as the charge occuring on the record disk is not perfectly neutralized by discharging it, then the purpose of increasing the capacitance as much as possible has been achieved. Many different kinds of liquid can be infused into the junction between the record disk complex formed from disks 18, 17 and the inner substance 16 in order to increase the capacitance. However, water which is easy to get has been used in an experimental record disk to carry out the invention. Water, which is a better conductor than an insulator increases the capacitance, and it is also suitable for the purpose of the structure, as is explained below. This structure, therefore, provides a satisfactory result.

Since the record disk which is conventionally made from a vinyl plastic is a form of insulator, the charge acquired by the record disk remains at the same position on the record disk at which it first originates. Nevertheless, with the elapse of long periods of time, there is the possibility of the substance 16 being gradually charged, but it is so minutely charged that it may for all practical purposes be neglected. Substance 16 is charged with the same polarity as the disk; it cannot be perfectly excluded from consideration because of a very slow diffusion of the remaining charge on the record disk except that charge which is liberated to the air. Because the resistance of the material of the record disk is not perfectly infinite, but in reality it has a resistivity of more than millions of ohms per $Cm^3$, though it is what can be called a kind of insulator, it can be considered to be similar to an insulator. Therefore, in order to keep the substance 16 always at ground potential, it is proposed to use conductive substances or materials 20, 21 which are added to the record disk.

Reference is now made in particular to FIG. 5, which shows the sandwich construction of the record disks 17, 18 and intermediate substance 16 provided with the conductive substances 20, 21. In addition, the record or disk complex includes labels 22 and 23. These labels 22, 23 are metal in lieu of the conventional paper labels. Label 22 and conductive substance 20, and label 23 and conductive substance 21 are electrically interconnected.

The paper labels which are replaced by conductive labels 22, 23 are preferably made of tin foil, or some other conductive material. These kinds of material which can be folded many times can also be used for the conductive substances 20, 21. Of course, for the best effect of this structure, the intermediate substance 16 used should have a better conductivity than the material of the record disk. When an insulator such as a piece of paper or cloth is used for the intermediate substance 16, it should be wetted by a kind of conductive liquid such as water.

The intermediate substance 16 used inside the record disk complex between disks 17, 18 can be easily kept at ground potential because on the one hand, a person's hand touches one of the conductive labels 22, 23 whenever the record disk complex is put into or taken out of the record jacket holder as shown in FIG. 6., and on the other hand, a person's hand usually presses down onto one of the conductive labels 22, 23 when the record disk complex 11C is cleaned by a record cleaner as shown in FIG. 7. In this case, an electrical connection between the intermediate substance 16 and the ground is made up through the body of the person. There is no electrical shock imparted to a person when a person's hand touches one of conductive labels 22 or 23 because of the relatively decreased electric voltage due to the increased capacitance of the record disk complex.

As most records are made with a center hole, the disk complex 11C as best seen in FIG. 8 which is also made with a center hole 24 for a spindle 25 of a record player. The labels 22 and 23 are folded into the center hole 24 and form folded-in pieces 26, 27 which form continuations of the labels and are folded into the central hole of the record disk complex, the substance 16 can also be kept at ground potential when the record disk complex is on the turn-table, because the electrical connections between the intermediate substance 16 and the ground is made up through the conductive substances 20 and 21 and the spindle 25 of the turn-table, schematically shown at 28.

FIG. 10 illustrates a preferred, and operative, reduced electrostatic force record disk complex separated into its different parts. It is preferably, if the thickness of each part or disk 17, 18 of the record disk complex 11C which sandwiches in the intermediate substance 16 used is made as thin as possible. However, in the preferred model, the thickness of each part 17, 18 of the record disk 11C is half of an ordinary record in order to compare the electrostatic forces of both. Each part of the record disks 11C has suitable holes for the conductive substances 20, 21 and water has been coated on the side of each part of the record disks 17, 18 which face the intermediate substance or support member 16.

Tin foil which is about 0.02 mm. in thickness is cut in the shape of a doughnut and is wetted by water for use as the support member or substance 16. The conductive substances 20, 21 can be made by first folding the tin foil many times so that it is a little thicker than each part of the record disk 17 or 18, and then punching out the conductive substances 20 or 21 from the folded tin foil.

Each part of the record disk complex 11C has three conductive substances 20 on one side and three conductive substances 21 on the other side, but the quantity of conductive substances 20, 21 are not limited to a minimum of three so long as each part of the record disk 17 or 18 has more than one because the purpose of conductive substances 20 or 21 is only to electrically connect the inner support member or substance 16 and the labels 22, 23. Each conductive substance 20, 21 is spaced apart at angular intervals of 60 degrees with the center of the record disk complex being the apex of the angle. The middle 30, 31 and edge of the record disks 17 and 18 directly touching each other as best seen in FIGS. 8, 11 and 12 are stuck or glued together with the industrial glue.

FIGS. 9A and 9B show a simple way of comparing the electrostatic forces of both record disks 11 and 11C. The object 14, as stated above and drawn in FIGS. 1 and 2 is suspended from the arm of a reversed "L" 34 attached to the corner of table 13. In FIG. 9A, an ordinary record disk 11, and in FIG. 9B, the complex disk 11C according to the invention are brought near the object 14 in turn after rubbing them equally vigorously with a record cleaner. If the distances between the object 14 and each record disk at the point where it begins to attract the object 14 are compared, a difference of more than ten times can be observed, even taking into consideration some small errors in measurements due to the different quality of various record disks.

The foregoing experiment indicates that the record disk complex according to the invention can minimize the electrostatic force in relation to the increase in its electrostatic capacitance.

Referring now and more particularly to FIGS. 10, 11 and 12, it will be noted that the conductive labels 22, 23 are in contact with each other in the aperture 24 through which spindle 25 passes. Further, the support member 16 which is metallic is shown spaced (in FIG. 12) from the joining edges of the metallic labels. It will also be noted that one of the conductive substances 20 is shown connecting the metallic label 23 with the metallic support member 16, and these various metallic members and spacings together with the vinyl plastic disks 17, 18 form the required capacitors to reduce the electrostatic forces. Disks 17, 18 and the air space provide the necessary dielectric materials.

While there has been shown what is considered to be the preferred embodiments of the invention, it will be obvious that various changes and modifications may be made therein without departing from the scope of the invention.

I claim:

1. A disk complex for reducing the electrostatic forces on a record disk used for storing audio information, comprising:
   a conductive support member;
   two opposed spaced vinyl plastic surface members each carried by said support member for the recording, storing and releasing of audio information contained in electrical signals, said vinyl plastic members being in the form of a disk which substantially conforms to the surface of said support member, each said disk being provided with at least one circumferentially spaced aperture inwardly of the outer periphery thereof extending from the outer facing surfaces thereof inwardly to the top surface of said support member;
   electrostatic force reducing means coupled with said surface members and said support member, said support member and said surface members together forming a sandwich construction;
   a pair of conductive labels positioned on the outer facing surfaces of said plastic members and overlying said force reducing means to thereby couple said labels to said support member coupled with said support member; and,
   said electrostatic force reducing means includes a conductive substance received in each of said spaced apertures for filling thereof to provide for a uniform and continuous outer surface on the outer facing surface of said vinyl plastic members, and said conductive support member and conductive labels together have a capacitative effect for reducing electrostatic forces on the outwardly facing surfaces of the surface members.

2. The disk complex as claimed in claim 1, wherein said each disk having a plurality of apertures for said conductive substances, said conductive substances being each spaced equidistant from each adjacent conductive substance along a circle concentric with the outer perimeter of said sandwich construction and on a side opposite to the side of the two adjacent conductive substances.

3. A disk complex for reducing the electrostatic forces on a record disk used for storing information, comprising:
   a support member;
   surface means carried by said support member for storing information;
   electrostatic force reducing means coupled with said surface means and said support member;

said support member being an insulator; and the portion of said support member coupled with and facing said surface means being wetted by a conductive liquid.

4. The disk complex as claimed in claim 3, wherein said surface means includes a vinyl plastic material suitable for the recording, storing and releasing of information contained in electrical signals, and said electrostatic force reducing means includes a conductive material carried on an outer facing surface of said vinyl plastic material, said conductive material and said support member together producing a capacitative effect for reducing the electrostatic forces on the outer surface of said vinyl plastic material.

5. The disk complex as claimed in claim 3, wherein said surface means includes a vinyl plastic material suitable for the recording, storing and releasing of audio information contained in electrical signals, said vinyl-plastic material being in the form of a disk which substantially conforms to the surface of said support member, said disk being provided with at least one circumferentially spaced aperture inwardly of the outer periphery thereof extending from a top surface thereof inwardly to the top surface of said support member; and, said electrostatic force reducing means includes a conductive substance received in each of said spaced apertures for filling thereof to provide for a uniform and continuous outer surface on the outer facing surface of said vinyl plastic material.

6. The disk complex as claimed in claim 3, wherein said electrostatic force reducing means includes a conductive material on a face of said surface means free of contact with said support member.

7. The disk complex as claimed in claim 3, wherein said surface means includes first and second vinyl plastic surface members suitable for the recording and transmission of information in the form of electrical signals, said said first member being positioned on one side of said support member and said second member being positioned on the other side of said support member, said first member, said second member and said support member together forming a sandwich construction and having a circular peripheral edge configuration, said first and second members each having a plurality of apertures opening transversely therethrough and extending from an outer surface thereof inwardly to said support member, said apertures being circumferentially inwardly spaced from the peripheral edge of said sandwich construction, and said electrostatic force reducing means including a conductive substance received within each of said apertures and extending from said support member to the outer facing surfaces of each of said first and said second vinyl plastic surface members.

8. The disk complex as claimed in claim 7, wherein said sandwich construction includes a coupling means at the center thereof for coupling said sandwich construction to a record player, and said electrostatic force reducing means includes a conductive label on each side of the outer facing surface of said plastic surface members and having a portion thereof connected through said coupling means, said conductive label overlying said conductive substances.

9. The disk complex as claimed in claim 7 or 6, wherein said conductive substances are each spaced equidistant from each adjacent conductive substance along a circle concentric with the outer perimeter of said sandwich construction and on a side opposite to the side of the two adjacent conductive substances.

10. The disk complex as claimed in claim 3, wherein said support member and said surface means are of different materials.

* * * * *